(12) United States Patent
Heule et al.

(10) Patent No.: US 7,524,149 B2
(45) Date of Patent: Apr. 28, 2009

(54) TOOL FOR COUNTERSINKING, DEBURRING AND/OR SPINDLING OUT HOLES

(75) Inventors: Heinrich Heule, Au (CH); Roland Schmitter, Altstaetten (CH); Swen Haemmerle, Widnau (CH)

(73) Assignee: Ulf Heule, Belgach (CH)

( * ) Notice: Subject to any disclaimer, the term of this patent is extended or adjusted under 35 U.S.C. 154(b) by 781 days.

(21) Appl. No.: 10/423,265

(22) Filed: Apr. 25, 2003

(65) Prior Publication Data

US 2004/0005200 A1    Jan. 8, 2004

(30) Foreign Application Priority Data

Apr. 26, 2002  (DE)  ................................ 102 18 875

(51) Int. Cl.
B23B 51/00 (2006.01)
(52) U.S. Cl. ...................................... 408/173; 408/153
(58) Field of Classification Search ................. 408/153, 408/173, 178, 158, 161, 168, 181, 183, 54, 408/93; 409/234, 299, 232; 407/113, 33, 407/99

See application file for complete search history.

(56) References Cited

U.S. PATENT DOCUMENTS

| | | | | |
|---|---|---|---|---|
| 306,189 A | * | 10/1884 | Thompson | .................. 408/168 |
| 3,073,186 A | * | 1/1963 | Flannery | ...................... 408/181 |
| 3,296,897 A | * | 1/1967 | Konwal | ...................... 408/181 |
| 3,343,431 A | * | 9/1967 | Boyer | .......................... 408/153 |
| 4,309,133 A | * | 1/1982 | Hamilton | .................... 408/183 |
| 4,318,647 A | * | 3/1982 | Erkfritz | ....................... 408/153 |
| 4,611,959 A | * | 9/1986 | Kress et al. | .................. 408/180 |
| 4,795,290 A | * | 1/1989 | Lindberg | .................... 408/224 |
| 4,880,339 A | * | 11/1989 | Doge | .......................... 408/161 |
| 5,501,554 A | * | 3/1996 | Robinson et al. | ............. 408/153 |
| 6,394,465 B1 | * | 5/2002 | Guy | ............................ 279/9.1 |
| 6,428,247 B1 | * | 8/2002 | Friedman | .................... 407/110 |
| 6,582,163 B2 | * | 6/2003 | Hansson et al. | ............. 407/110 |
| 7,338,051 B2 | * | 3/2008 | Buchholz | ...................... 279/19 |

* cited by examiner

Primary Examiner—Dana Ross
Assistant Examiner—Jamila Williams
(74) Attorney, Agent, or Firm—Wood, Herron & Evans, LLP

(57) ABSTRACT

A tool for countersinking, deburring and spindling out holes is described, consisting of a blade holder driven rotationally about its longitudinal axis, in which, at an angle to its longitudinal axis, at least one recess is arranged, in which one or more cutting blades or their holders are held as exchangeably and/or displaceably load-transmitting. In order to guarantee better protection against tilting and breaking of the cutting blade out of the recess in the blade holder it is provided that the recess is formed from radii substantially blending into one another.

28 Claims, 8 Drawing Sheets

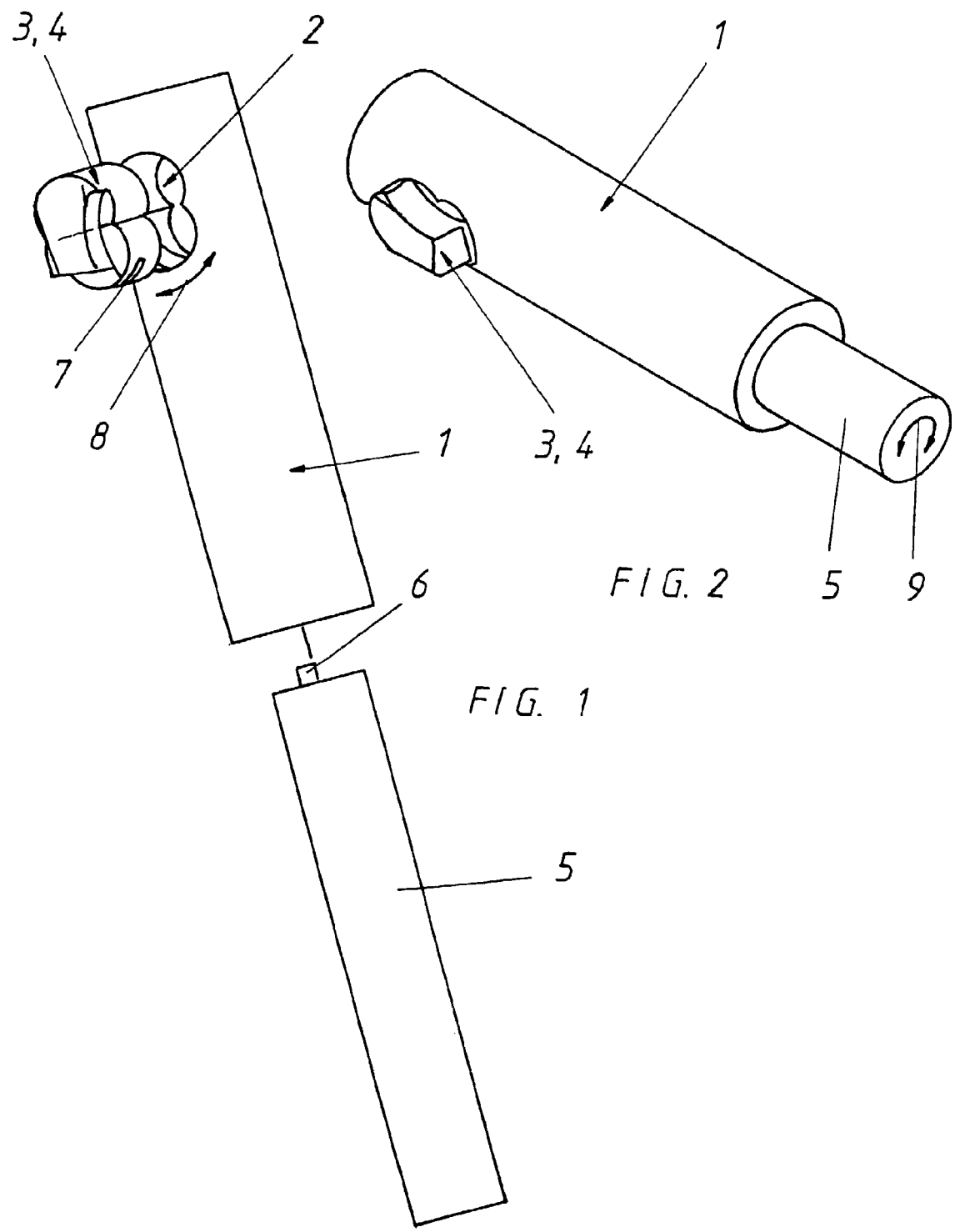

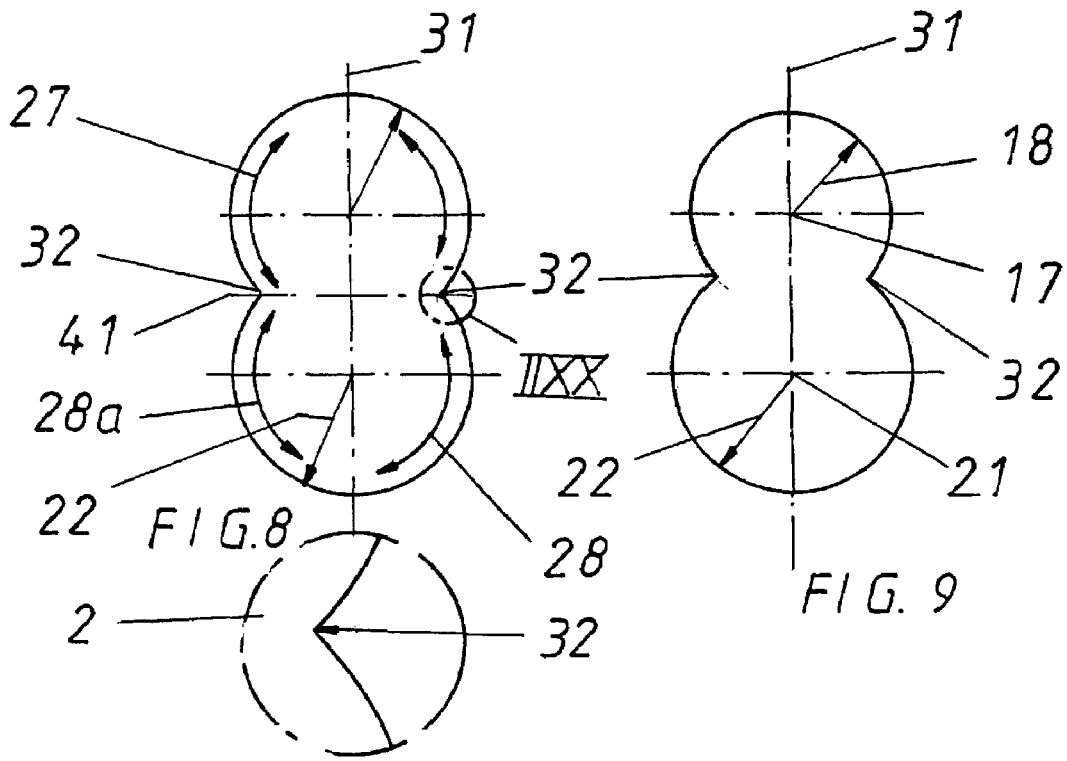
FIG. 8
FIG. 9
FIG. 18
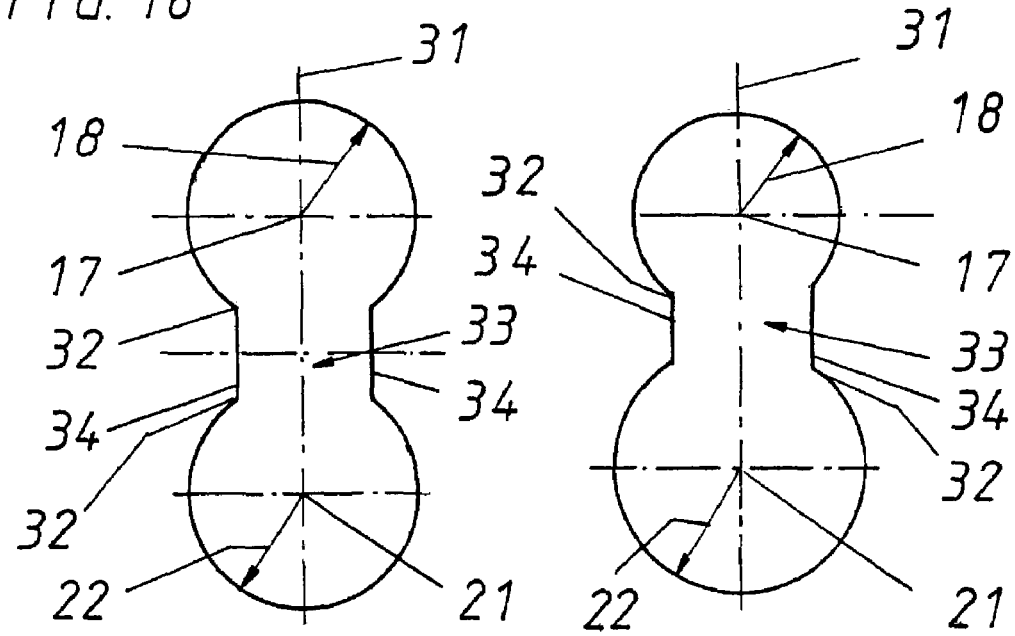
FIG. 10
FIG. 11

TOOL FOR COUNTERSINKING, DEBURRING AND/OR SPINDLING OUT HOLES

The invention relates to a tool for countersinking, deburring and/or spindling out holes according to the preamble of patent claim 1.

Tools for countersinking, deburring and spindling out holes are known, in which a blade holder driven rotationally about its longitudinal axis is used. In this blade holder, at an angle to its longitudinal axis, there is at least one recess, at least partially surrounding the body of the blade holder, in which a cutting, countersinking or deburring blade is arranged.

However, the invention relates not only to the guiding of cutting blades in a blade holder for countersinking, deburring and spindling out holes, but also to a holder for a cutting blade arranged exchangeably in the tool.

Blade holders of this kind with cutting blades guided in a recess are known. However it is known only to configure the recess as approximately angular with sharp edges and to match the cutting blade to this angular shape, in order to achieve sliding or displacement guiding of the cutting blade in this recess.

The angular configuration of the cutting blade with a matching recess has, however, the disadvantage of difficult manufacture. The recess can to date be manufactured only by means of erosion, which is associated with great machining expense. Manufacture of the cutting blades matched to the **recess is also relatively expensive.

The construction of an angularly shaped recess with a coordinated cutting blade matched in shape has the further disadvantage that during machining of workpieces to remove chips there is a danger that the cutting blade tilts in the area of the recess. This leads to premature wear of the guide edges in the recess and otherwise to jamming of the cutting blade in this longitudinal guide of the blade holder.

When the machine tool spindle with the cutting blade wedged in the longitudinal guide of the recess of the blade holder is pulled out, the cutting blade impacts against hole edges of the workpiece and breaks. Moreover, the blade holder can be damaged by the breaking out of the cutting blade.

If sharp edges are created in a recess guiding the cutting blade, this leads to weakened breaking points, which impair the overall stability of the blade holder.

Therefore the object of the invention is to further develop a tool of the kind initially mentioned with at least one recess and a cutting blade guided therein or a holder for a cutting blade in such a way that, with dimensions of the cutting blade remaining the same, substantial higher cutting powers can be absorbed and improved load-transmitting guiding of the cutting blade or its holder in the blade holder is produced.

To achieve the object set the invention is characterised by the technical doctrine of claim 1.

A substantial feature of the invention is that instead of an angular recess in a blade holder a recess is now provided consisting substantially of radii and/or straight lines and/or sections blending into one another.

It is herein preferred if two radii arranged approximately symmetrical to one another and positioned opposite one another blend into one another and the transition area is also formed by smaller radii.

Therefore according to the invention an approximately figure-of-eight-shaped (or horseshoe-shaped) recess is proposed, in which the blade or its holder is guided displaceably.

For reasons of simplification, in the following description there is reference to only one (and not several) blade(s) and no longer to a holder for one or more cutting blades. The invention relates, however, to both one (or more) cutting blade(s) and one (or more) holder(s) for a cutting blade, because both parts according to the invention are guided displaceably in a recess of this kind (or else in several recesses of the blade holder).

The term "guided displaceably" is also broadly understood within the scope of the present invention. By this is understood, on the one hand, that in a deburring tool the cutting blade is held in the recess in the blade holder driven as correspondingly displaceable. The cutting blade is herein guided in the recess with the low play of a sliding guide.

The invention also relates, on the other hand, to tools with a cutting blade rigidly arranged in the recess, which in the operating state is guided as not longitudinally displaceable. A cutting blade of this kind (or the associated holder) is then fixed only in the recess; it can also be fixed there as adjustable (e.g. via a spindle drive or via an adjustment screw). During operation, however, a cutting blade of this kind is held as stationary in the recess.

In a first embodiment the invention provides that the shape (outer contour) of the cutting blade is matched to the contour of the recess in the tool holder. There is only a small adjustment play between the outer circumference of the cutting blade and the inner circumference of the recess.

In a second embodiment it is provided, on the other hand, that the contour of the recess in the tool holder does not correspond to the profile of the cutting blade. In this embodiment the outer circumference of the cutting blade is applied in a load-transmitting manner only to certain zones on the inner circumference of the recess in the tool holder. The advantage of this embodiment is that in the non-load-transmitting areas large open spaces arise in which the chips arising during machining of the workpiece can be easily accommodated and removed.

In both embodiments substantially better load transmission of the cutting and tilting forces of the blade in a recess in the blade holder, constructed from several radii blending into one another, is achieved.

It has been proved that an identically dimensioned recess arranged in a blade holder, consisting of rectangles adjoining one another, is substantially less favourable with respect to resistance to breaking.

The sharp edges according to the prior art are undesired predetermined breaking points and, with the same requirement of resistance to breaking, the need arises to make the recess larger than, by comparison, the recess according to the invention with radii blending into one another. In this way—with a blade holder according to the prior art—the blade holder is weakened by the necessarily larger recess and can now transmit only smaller tilting and rotational forces.

Naturally the invention is not confined to a simple "8" as a recess for a blade, but a recess formed from several radii (more than are necessary to form an "8") can be provided. This includes, e.g., a double-8 and other configurations, in which it is essential only that continuous, bent curved sections blend into one another without forming troublesome edges between themselves, and can include bone- or kidney-shaped, doubleleaf-shaped, double-trochoidal-shaped and double-pentagonal-shaped forms.

Naturally the invention also provides that, if radii blend into one another (in particular with the large radii with the smaller radii adjoining them and positioned opposite) the radii sections connecting there are connected to one another by straight lines.

Otherwise the invention is not confined to the longitudinal axis of the recess for accommodating the blade being perpendicular to the longitudinal axis of the blade holder. The longitudinal axis of the recess can also be constructed crosswise to the longitudinal axis of the blade holder. Equally, several recesses located on top of one another or next to one another can be provided on the blade holder and it can also be provided that with several recesses located on the same machining radius, they blend into one another.

Equally the blade can be arranged on the lower front side of the blade holder, so the longitudinal axis through the recess is constructed as flush with the longitudinal axis of the blade holder.

Equally the invention is not confined to only one single cutting blade or its holder being provided. On the blade holder a front and a rear cutting blade can be arranged in the same recess or various cutting blades can be provided in various recesses.

In a preferred configuration of the present invention the longitudinal extension of the approximately horseshoe-shaped recess is arranged parallel to the longitudinal axis of the blade holder.

In another configuration of the invention it is provided that the longitudinal extension of the horseshoe-shaped recess is constructed as perpendicular (or at an angle deviating from 90 degrees) to the longitudinal axis of the blade holder.

The invention is explained in greater detail below using drawings illustrating only one method of embodiment. Further features and advantages of the invention herein emerge from the drawings and their description.

FIG. 1 shows a perspective side view of a blade holder in the dismantled state.

FIG. 2 shows the blade holder according to FIG. 1 in the assembled state.

FIG. 8 shows a variant of the recess for the cutting blade according to FIG. 7 without rounded transitions between the large radii.

FIG. 9 shows a variant of the recess for the cutting blade according to FIG. 8 with different dimensions of the large radii.

FIG. 10 shows a variant of the recess for the cutting blade according to FIG. 8 with straight lines between the large radii.

FIG. 11 shows a variant of the recess for the cutting blade according to FIG. 9 with straight lines between the large radii or according to FIG. 10 with different dimensions of the large radii.

FIG. 18 shows an enlarged detail illustration of the recess for the cutting blade according to FIG. 8 in the area of the sharp-edged transition of the large radii.

Figure 3:
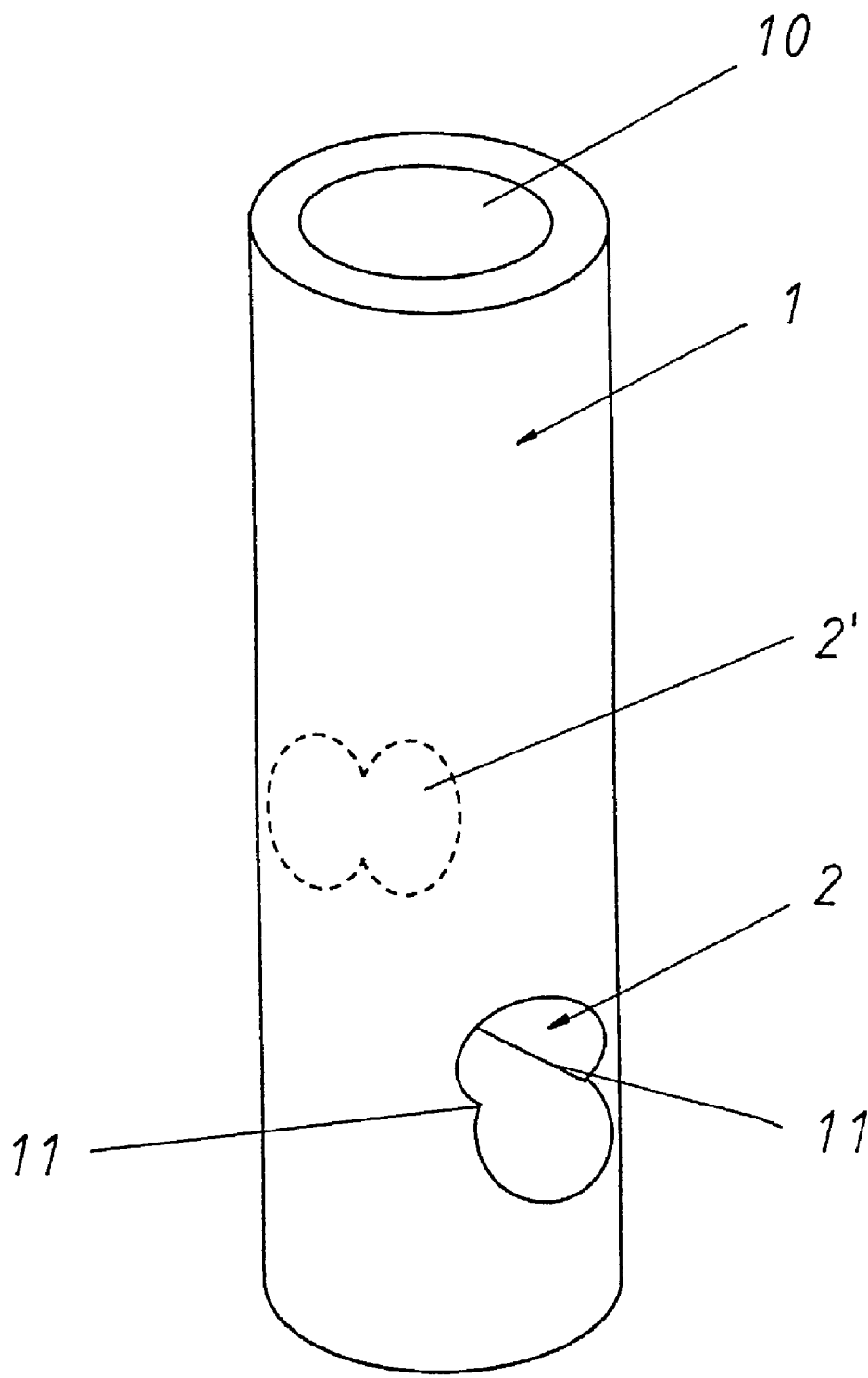
FIG. 3 shows the blade holder according to FIGS. 1 and 2 without drive rod and without blades.

In FIG. 1 an approximately cylindrical blade holder 1 is illustrated, consisting of a rotationally symmetrical part, driven rotationally about its longitudinal axis in arrow direction 9. The rotary drive by a tool spindle is not herein illustrated. The blade holder 1 has according to FIG. 3 a central longitudinal hole 10 in which a drive rod 5 is rotatably accommodated.

Eccentrically on the front side of the drive rod 5 a cam 6 is arranged, which engages in a coordinated channel 7 of the cutting blade 3, so it is guided displaceably in the recess 2 in the blade holder 1 when the drive rod 5 rotates in arrow directions 8. The recess 2 herein penetrates the blade holder 1 over its entire width. However, this is not decisive for implementing the invention. It can also be provided to embody the recess 2 only as a "sack recess".

The tool drawn acts in the embodiment example as a countersinking tool, with which—when the cutting blade 3 is inserted into the recess 2—a hole is passed through and then the cutting blade 3 is pulled out of the blade holder 1, in order to apply countersinking in the area of a further hole adjoining it.

This field of application is, however, not confined to countersinking tools, as explained in the general description. It is therefore only a preferred embodiment example, which is not to be understood as restrictive to the invention.

Therefore, for the reasons mentioned for the cutting blade, besides the reference numeral 3, an additional reference numeral 4 is used for a (not illustrated) holder for a cutting blade of this kind.

FIG. 3 also otherwise shows that the approximately horseshoe-shaped recess 2 does not have to be located with its longitudinal extension parallel to the longitudinal axis of the blade holder 1, but in FIG. 3 by dotted lines it is illustrated that a recess 2' can also be arranged with its longitudinal extension perpendicular to the longitudinal axis of the blade holder 1.

Figure 4:
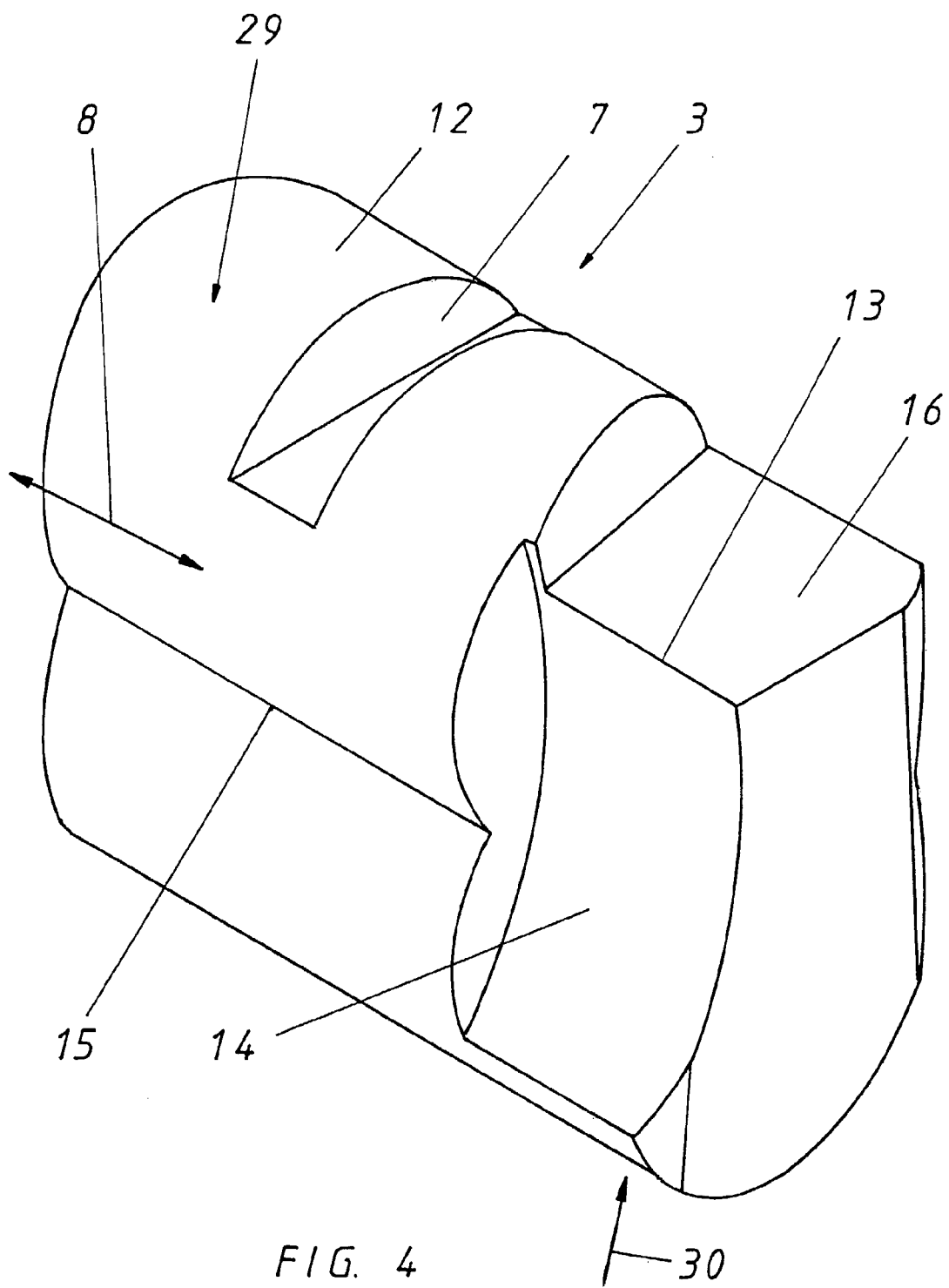
FIG. 4 shows an embodiment example of a cutting blade for the blade holder according to FIGS. 1 to 3.

The cutting blade 3 is described according to FIG. 4 in greater detail. It consists of a body 12, in which in the circumferential direction the channel 7 for the engagement of the cam 6 of the drive rod 5 is incorporated.

On the front edge, set back from the body 12, a cutting edge 13 is provided, which performs the chip-removing machining of the hole. The cutting edge 13 blends into an open face 16.

Below the cutting edge 13 a chip channel 14 is arranged in a way known per se, which acts as downward facing outlet of the chips removed by the cutting edge 13.

The cutting blade 3 is thus guided displaceably in the recess 2, 2' in arrow directions 8 and the tilting forces acting on the cutting blade 3 are substantially transmitted from two diametrically opposite positions 29, 30 of the cutting blade on to the coordinated guide and support faces in the recess 2.

Figure 5:
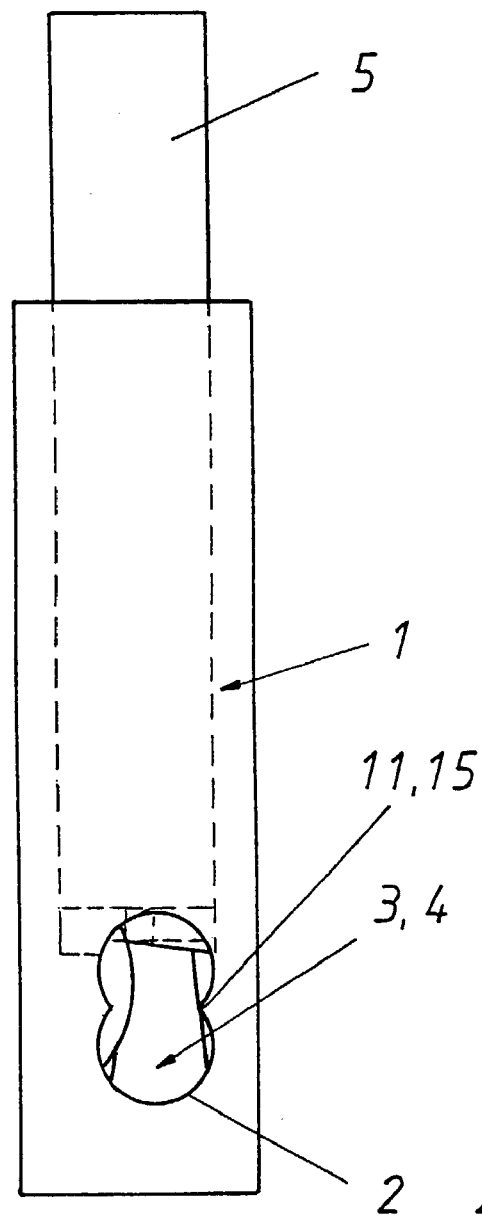
FIG. 5 shows the blade holder according to FIGS. 1 to 4 in the assembled state.
Figure 6:
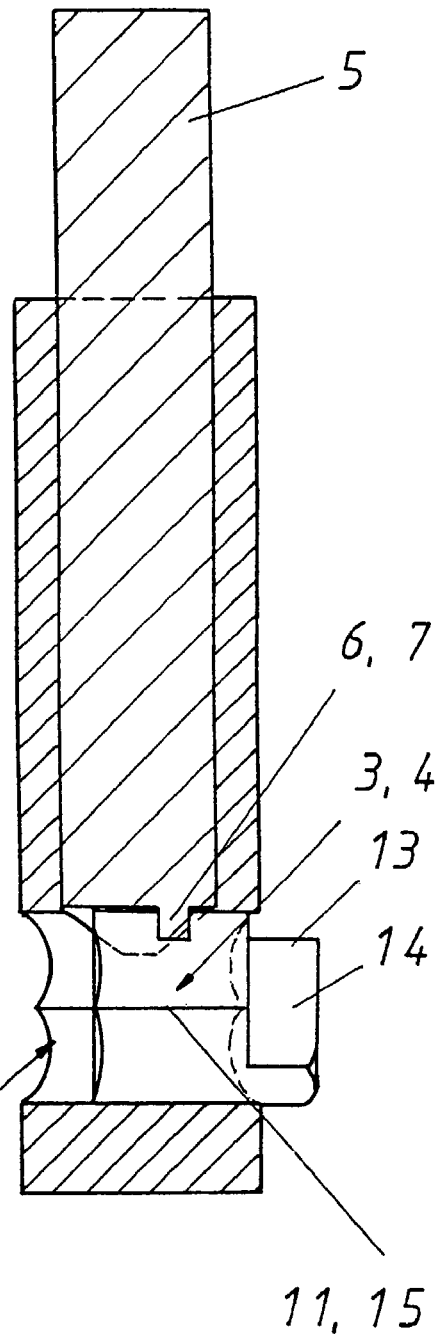
FIG. 6 shows a section according to line A-A in FIG. 5.

FIGS. 5 and 6 show the assembled state, from which it can be seen that the cutting blade 3 or the holder 4 for this cutting blade is guided displaceably in the recess 2.

Figure 7:
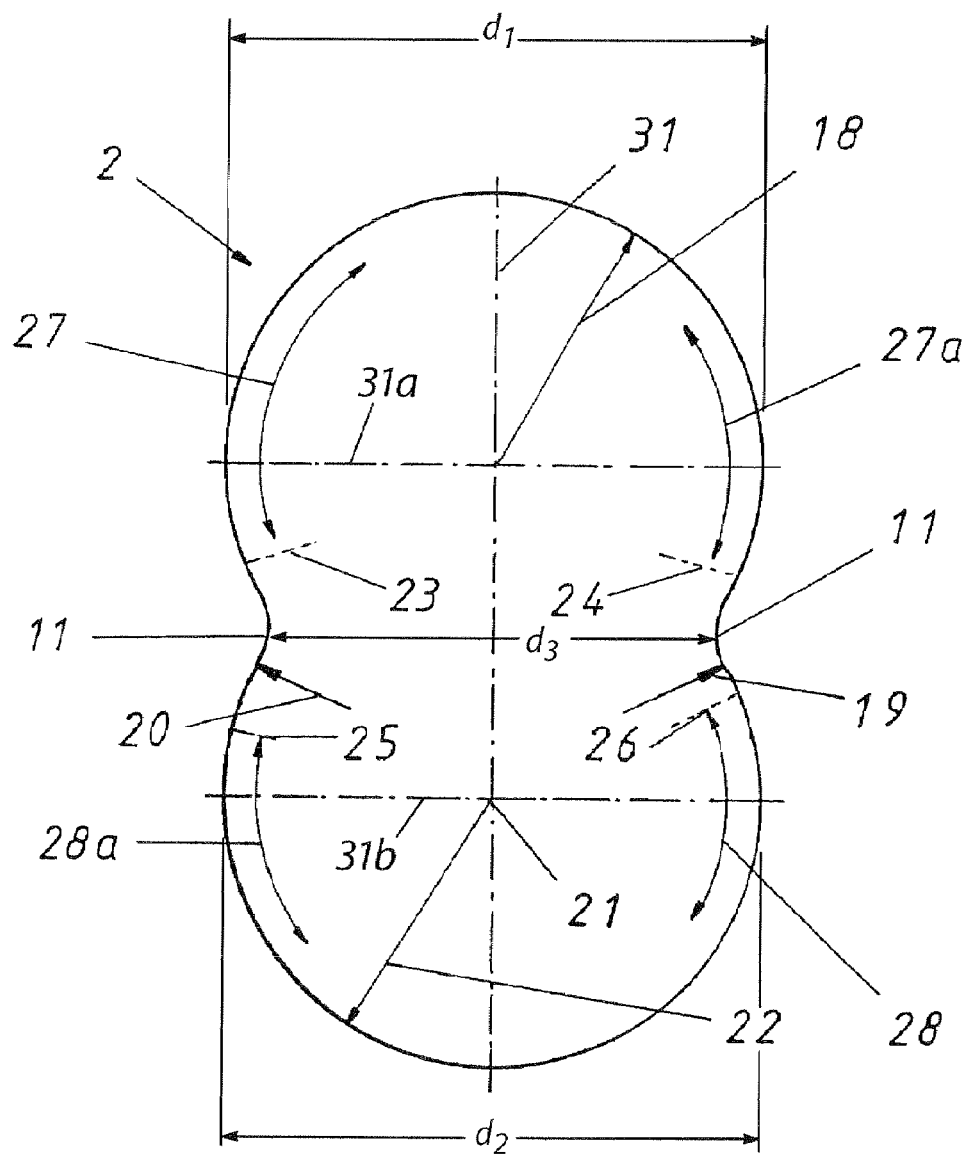
FIG. 7 shows an enlarged illustration of the recess for the cutting blade.

In FIG. 7 the further details of the approximately horseshoe-shaped or figure-of-eight-shaped recess 2 are illustrated. It is important that the upper part of the recess 2 is formed by a radius 18 starting from a mid-point 17. The lower part of the recess is formed by a radius 22 starting from a mid-point 21.

The two radii 18, 22 can be chosen as equal, but they can also be different.

It is not necessary for achievement of the invention for the mid-points 17, 21 of radii 18, 22 to be located flush to one another on the longitudinal extension 31 of the recess 2. These two mid-points 17, 21 can also be arranged as offset in respect of one another from the longitudinal extension 31.

It is important that the two radii 18, 22 are chosen in such a way that they intersect in a central area, i.e. blend into one another. This central or transition area is formed by further, smaller radii 19 and 20, facing in opposite directions.

It is not necessary for achievement of the invention for the larger radii 18 and 22 to blend continuously into the smaller radii 19, 20 with bends. In the transition areas located in between, short straight lines (or other slightly bent curved pieces), connecting these radii (continuously or discontinuously) can be provided.

With the technical doctrine according to the invention an improvement in the load transmission from the cutting blade 3 to the recess 2 now takes place.

It has emerged that, for example, in the upper part of the recess 2—in the area of radius 18—load transmission begins first approximately at position 23 and extends to approximately position 24.

The greatest proportion of the tilting and rotational forces is, however, transmitted in the arc of the load transmission 27 illustrated. There the cutting blade comes into load-transmitted contact in the area of radius 18, wherein the counter-load transmission 27a serves only for guiding and securing the position.

The same applies to the lower radius 22, where load transmission begins at approximately position 25 and stops at position 26. There too the substantial part of the load transmission 28 takes place in the area of the arc drawn, while with the opposite 28a only guiding and securing of the position takes place. According to this in the area of the recess 2 there are two large-area, arc-shaped load transmission areas 27 and 28 diametrically opposite one another, which effect guiding of the blade in the recess 2 with high load capacity.

The load transmission conditions described relate to the embodiment according to FIG. 6, in which the cutting edge 13 of the blade is aligned for reverse machining of the hole.

In the same way the cutting edge 13 can be arranged close to the front side of the blade holder 1—for forwards moving machining—in which case the reverse load transmission conditions apply analogously.

In the embodiment example the longitudinal extension 31 of the recess 2 is aligned parallel to the longitudinal axis of the blade holder.

FIG. 3 shows that the longitudinal extension 31 can also be arranged perpendicular to the longitudinal axis of the blade holder.

Advantages of the approximately horseshoe-shaped construction of the recess 2 according to FIG. 7 emerge in the area of radii 19, 20. The cutting blade 3 acts on the securing edges 11, 11a with coordinated security edges 15, wherein in this area, however, substantially no load transmission takes place.

By constricting the securing edges 11, 11a in the material of the blade holder 1, more material remains in this area and can therefore be used for better load transmission (with higher breaking load). The blade holder is therefore better protected against breaking.

If the two opposite radii 19, 20 are constructed as of different size, they act as key openings for the cutting blade. This can now be inserted into the recess 2 only in a certain orientation. If it is inserted into the recess offset by 180, it does not fit, because this is prevented by the differently constructed radii 19, 20.

Otherwise it is not necessary for the achievement of the invention for the longitudinal extension 31 of the recess 2 to run exactly parallel to the longitudinal axis of the blade holder 1. This longitudinal extension 31 can also be constructed as laterally offset from the longitudinal axis of the blade holder 1. In this case it is a recess 2 arranged eccentrically in the blade holder.

The advantage of the invention is that the entire recess 2 is formed by the radii 18, 19, 20, 22 blending into one another, so there are no longer any sharp edges. In this way the recess is better protected against breaking and improved longitudinal guiding of the cutting blade 3 with reduced danger of tilting is produced.

FIG. 7 shows the longitudinal axis 31 of the recess 2, the first and second transverse axes 31a and 31b, respectively, of the recess 2, and the first, second, and third transverse dimensions d1, d2, and d3, respectively, of the recess 2.

FIGS. 8 to 17 show embodiments, modified compared to FIG. 7, of the cross-sectional shape of the recess 2 and therefore also of the basic body 12 of the cutting blade 3 or the holder of the cutting blade 3 (not illustrated). In the drawings the main load area is designated by reference numeral 42.

FIG. 8 is changed compared with FIG. 7 in such a way that no rounding transitions or small radii 19, 20 are provided between the large radii 18, 22. The transitions between the intersecting radii 18, 22 are formed by edges 32 of differing degrees of sharpness. This is a more economical embodiment, which has less stability than FIG. 7, as during use of the blade 3 there is a slight wedge effect on the linear sharp edges 32. This wedge effect can, however, be ignored with small to average demands (cutting forces), as the load-transmitting faces at 27 and 28 are in the area of the large radii 18, 22. The recess 2 in FIG. 8 is both mirror-symmetrical to the longitudinal extension 31 (vertical axis) and mirror-symmetrical to the transverse axis 41.

In FIG. 18 an enlarged illustration of the linear sharp edges 32 can be seen.

FIG. 9 modifies the embodiment of FIG. 8 to the effect that different dimensions of large radii 18 and 22 are provided, wherein the upper large radius 18 is constructed as smaller. This example is intended to show only in general that the upper and the lower large radii 18 and 22 do not necessarily have to be of equal size. What is important, however, is that faces 27, 28 or 27a, 28a, which are loaded during the cutting process, form in total a sufficient resistance to the occurring stress. Depending on the shape of the blade holder 1, the radii 18, 22 of the recess 2 and therefore of the blade 3 or the further blade holder 4 for the blade can adopt different values. The recess 2 in FIG. 9 is only mirror-symmetrical to the longitudinal extension 31 (vertical axis), but not mirror-symmetrical to the transverse axis 41.

FIG. 10 provides a straight intermediate piece 33 between the two radii 18, 22 with parallel straight lines 34. The distance between mid-points 17 and 21 is drawn as larger than those between mid-points 17 and 21 of FIGS. 8 and 9. The two radii 18, 22 can herein virtually not intersect, as in FIG. 10, or else virtually intersect (not illustrated) and still have a straight intermediate piece 33 of this kind. The straight intermediate piece 33 is square, rectangular, trapezoid or rhomboid in cross-section, wherein they can also be present on each radius 18, 22 as mirror-symmetrically doubled. In this way larger, elongated blades 3 can also be accommodated in a blade holder 1 with a relatively small outer diameter, as otherwise the holes for radii 18, 22 would be larger than the outer diameter or the remaining wall thickness would be too small and therefore too weak. The recess 2 in FIG. 10 is again both mirror-symmetrical to the longitudinal extension 31 (vertical axis) and mirror-symmetrical to the transverse axis 41.

FIG. 11 is a modification of the embodiment according to FIG. 10 with different sizes of the large radii 18, 22. Here too the loaded contact faces 27, 28 or 27a, 28a are configured in total in such a way that the loading can be resisted. The recess 2 in FIG. 11 is again mirror-symmetrical only to the longitudinal axis 31 (vertical axis), but not mirror-symmetrical to the transverse axis 41.

Figures 12, 13:
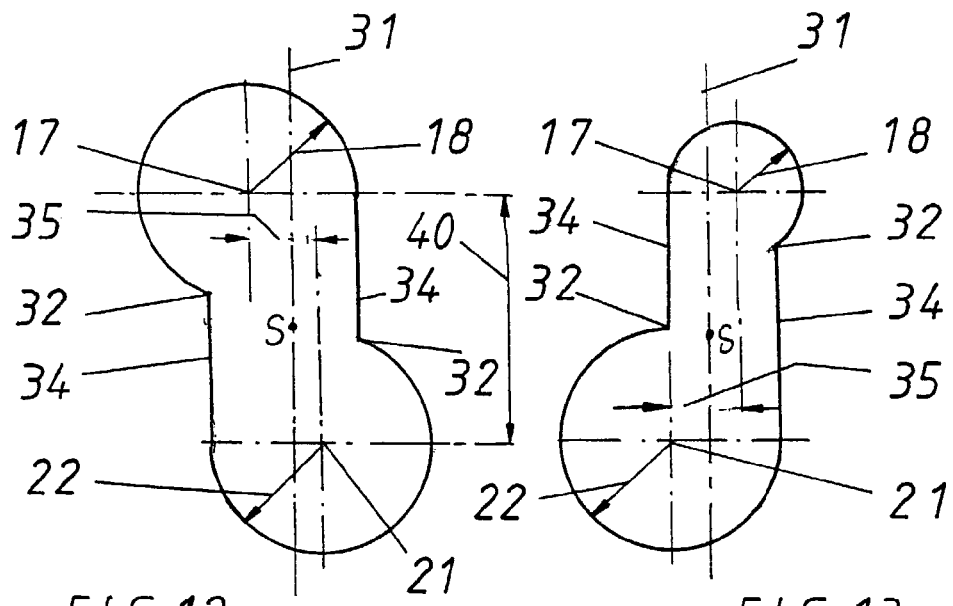
FIG. 12 shows a variant of the recess for the cutting blade according to FIG. 10 with lateral offset of the mid-points of the large radii.
FIG. 13 shows a further variant of the recess for the cutting blade according to FIG. 11 with lateral offset of the mid-points of the large radii or according to FIG. 12 with different dimensions of the large radii.

FIG. 12 shows that the large radii 18, 22, additionally to the vertical offset (40), can also be laterally horizontally offset from one another, which is particularly advantageous with asymmetrical blades 3 or if material is removed in only one direction of rotation. Owing to the horizontal offset 35 of mid-points 17, 21, in comparison to FIG. 10, other lengths of the straight lines 34 then also arise, so the intermediate piece 33 is differently shaped. In FIG. 12 one of the straight lines 34 is tangential to the upper radius 18 and the other straight line 34 is tangential to the lower radius 22. The recess 2 in FIG. 12 is point-symmetrical to the centre of gravity S.

FIG. 13 illustrates a variant to FIG. 12, with smaller upper large radius 18 and mirror-reversed offset, wherein the tangent (left straight line 34) of the upper large radius 18 runs through the mid-point 21 of the lower large radius 22.

Figures 14, 15:
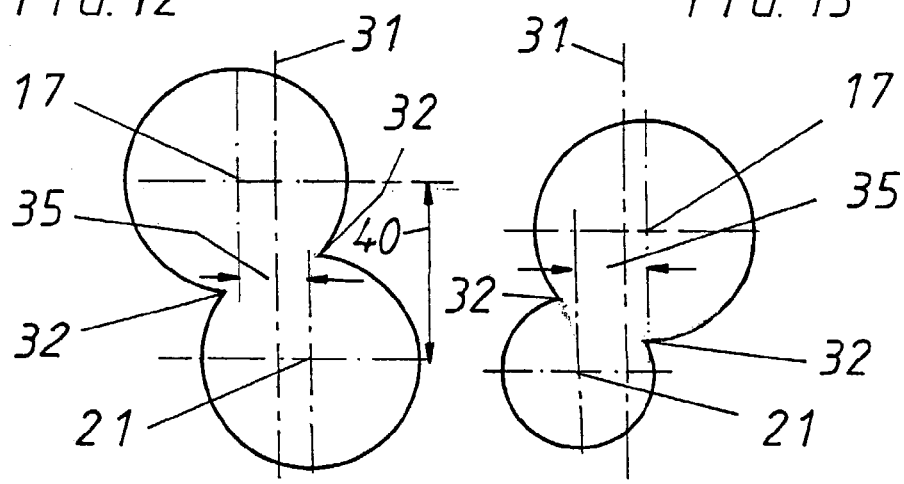
FIG. 14 shows a further variant of the recess for the cutting blade according to FIG. 8 with lateral offset of the mid-points of the large radii.
FIG. 15 shows a further variant of the recess for the cutting blade according to FIG. 9 with lateral offset of the mid-points of the large radii or according to FIG. 14 with different dimensions of the large radii.

FIG. 14 varies the embodiment according to FIG. 8 and FIG. 15 varies the embodiment according to FIG. 9 to the effect that the mid-points 17, 21 have an offset 35 from one another. The recess 2 in FIG. 14 is point-symmetrical to the centre of gravity S.

Figures 16, 17:
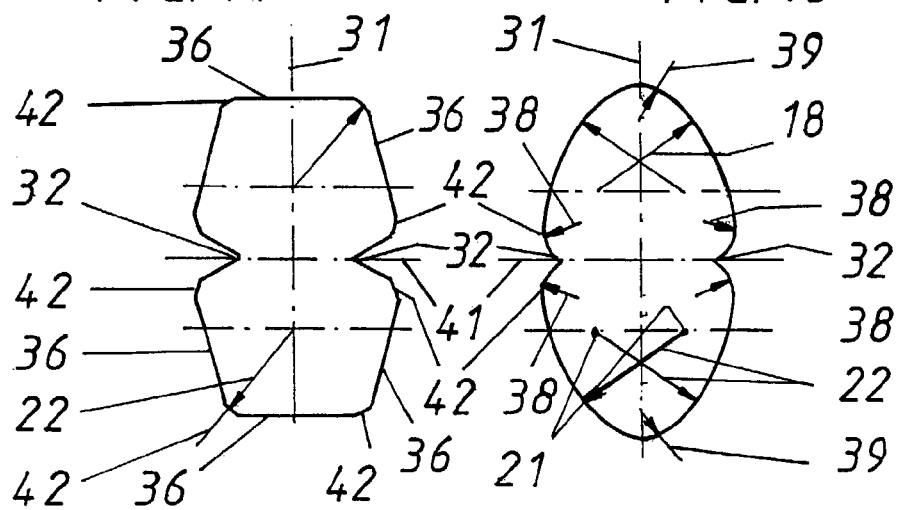
FIG. 16 shows a further variant of the recess for the cutting blade according to FIG. 8 with large radii cut by several faces.
FIG. 17 shows a further variant of the recess for the cutting blade according to FIG. 8 with large radii cut by several faces and small radii.

FIGS. 16 and 17 show a recess 2, compared with the embodiment according to FIG. 8, cut by faces and/or radii. A polygon in the form of a pentagon has been superimposed on the large radius 18, 22 in each case, wherein only the corners are still embodied as sections of the large radius 18, 22, connected via three long straight lines 36 and two short straight lines 37 in each case. In the area of the short straight lines 37 the two pentagon circle bodies are merged with one another mirror-symmetrically, wherein in each case the tip at the head of the pentagon is no longer present. The connection of the two pentagon circle bodies is again achieved by sharp edges 32, which again, however, are hardly or not load transmitting and therefore do not have to be rounded. The four lateral of the six long straight lines 36 form ideal flat flanks for transmitting the loads occurring during machining of the material.

FIG. 17 shows a further development of the embodiment of the recess according to FIG. 8, wherein in the central part left and right of the vertical axis an imaginary strip has been removed. The thus arising body has then been rounded at the transition points by means of the small radii 38 and 39. The mid-points 17 and 21 of the original large radii in FIG. 8 have doubled in each case in FIG. 17, wherein these doubles are at a horizontal distance, but not a vertical one, according to FIG. 17. This embodiment, by comparison with the recess 2 of FIG. 8, has a smaller effective load-transmitting surface, but can also be used with narrow and long blades 3 and smaller holes.

The recess 2 in FIGS. 16 and 17 is both mirror-symmetrical to the longitudinal extension 31 (vertical axis) and mirror-symmetrical to the transverse axis 41, Radii and/or bezels can be attached at all the transitions between the basic bodies of the recesses 2 of FIGS. 8 to 17, for example, smaller radii 19 and 20 instead of the sharp edges 32.

All the geometries of the recesses 2 of FIGS. 7 to 17 can also be cut by one, two or more faces and/or radii, as illustrated in FIGS. 16 and 17.

It should once again emphatically be pointed out that all geometries of the cross-sections or inner surfaces of the recesses 2 of FIGS. 7 to 17 also of course apply to the geometries of the cross-sections or outer surfaces of the basic bodies 12 of the blades 3 or the blade holders 4. The shapes of the recesses 2 correspond approximately to the shapes of the basic bodies 12 of the blades 3 or the blade holders 4, which are accommodated in the recesses 2 as rigid or movable in respect of their own longitudinal axis.

Figure 19:
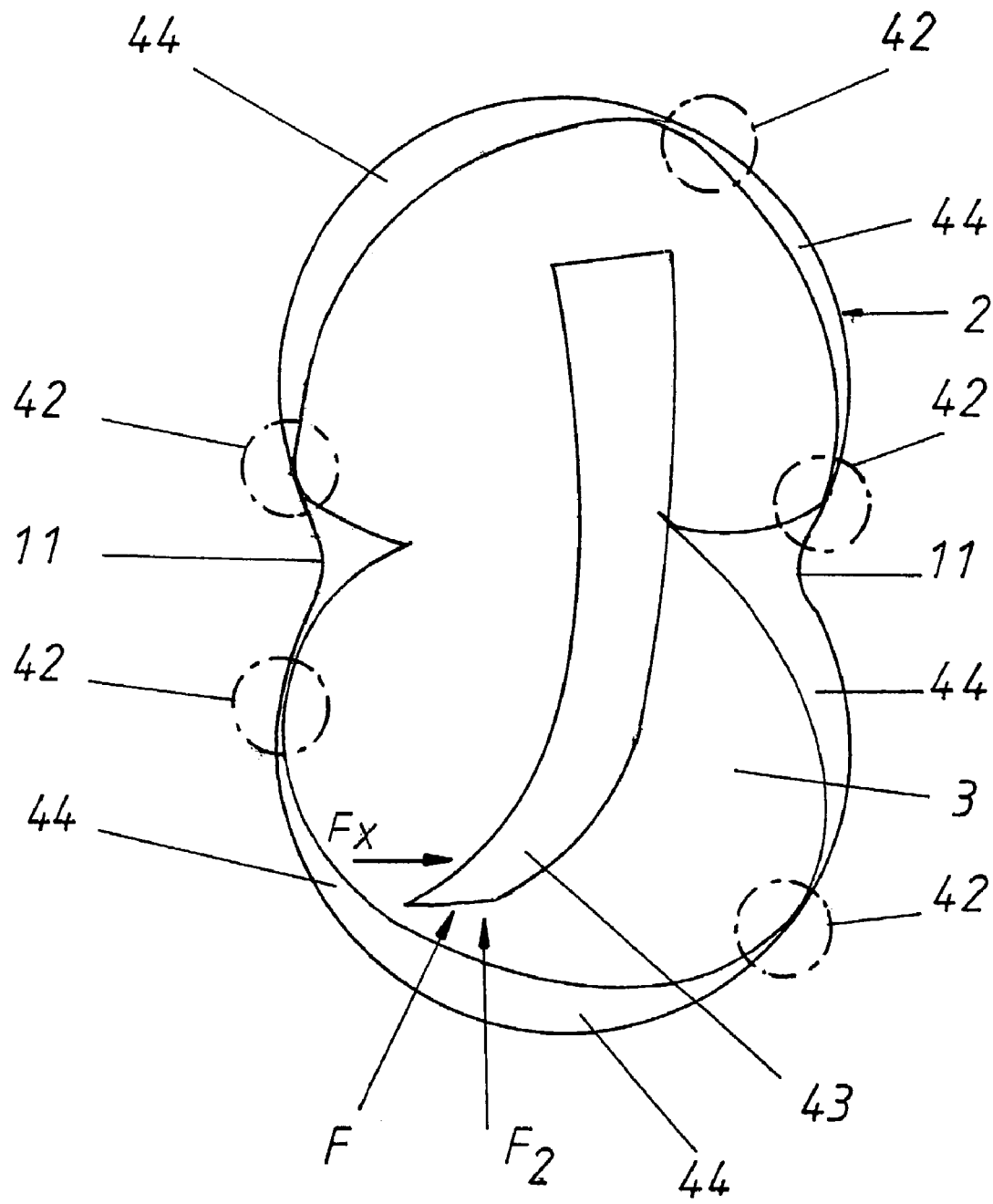
FIG. 19 shows schematically the engagement of a cutting blade into a recess in the blade holder not matched to the shape of the cutting blade.

FIG. 19 shows as a further embodiment example that a cutting blade 3 profiled in a certain way engages in a differently profiled recess 2 and is there guided displaceably. Therefore there emerge only a few load-transmitting contact zones between the cutting blade and the coordinated contact faces in the recess 2. The contact zones are again designated as main load area 42. The cutting force F of the cutting edge 43 of the blade is separated into the two components Fx and Fz, perpendicular to one another, and transmitted via the main load areas 42, present piece by piece, to the recess 2. Between these areas 42 open spaces 44 emerge, which do not have a load-transmitting effect and in which chips can stick, without the displacement guiding of the cutting blade in the recess being impaired. These chips can therefore easily be removed.

Drawings Legend 1 blade holder 2 recess 2' recess 3 cutting blade 4 holder for cutting blade 5 drive rod 6 cam 7 channel 8 arrow direction 9 arrow direction 10 longitudinal hole 11 securing edge (housing) 11a securing edge (housing) pentagon 12 body 13 cutting edge 14 chip channel 15 securing edge 16 open face 17 mid-point 18 radius 19 radius 20 radius 21 mid-point 22 radius 23 position 24 position 25 position 26 position 27 load transmission 27a load transmission 28 load transmission 28a load transmission 29 position 30 position 31 longitudinal extension 32 unrounded transition 33 intermediate piece 34 straight line 35 horizontal offset 36 long straight line pentagon 37 short straight line pentagon 38 small radius 39 small radius 40 vertical offset 41 transverse axis S centre of gravity 42 main load area 43 cutting edge 44 open space

The invention claimed is:

1. Tool for countersinking, deburring or spindling out holes, said tool comprising a blade holder, driven rotationally about its longitudinal axis, in which, at an angle to its longitudinal axis, at least one recess is arranged, in which one or more cutting blades or blade adapters are held as exchangeably or displaceably load-transmitting members, wherein the recess is formed from two substantially parallel cylindrical sections having first and second radii, the centers of said cylindrical sections being offset from each other a distance less than the sum of said first and second radii to substantially cause said cylindrical sections to blend into one another, said cylindrical sections having respective perimeters, said one or more cutting blades or blade adapters conforming to at least a portion of both said perimeters of said cylindrical sections.

2. Tool for countersinking, deburring and spindling out holes, said tool comprising a blade holder, in which at an angle to its longitudinal axis, at least one recess is arranged, in which one or more cutting blades or blade adapters are held as exchangeably or displaceably load-transmitting, both the recess and a basic body of the the one or more cutting blades or blade adapters for the cutting blade located in the recess being formed in a geometric main load area from two radii substantially blending into one another or being spaced apart by crosswise straight lines, located at an angle in relation to a load introduction direction or to the longitudinal extension of the recess or of the blade or blade adapter, wherein the midpoints of the two radii are offset from one another by a horizontal and vertical offset.

3. A tool for at least one of countersinking, deburring, and spindling out holes, said tool comprising:
  a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;
  said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and
  one of a cutting blade and a cutting blade adapter for receiving a cutting blade having a cross-section which corresponds approximately to said recess cross-section, said one of said cutting blade and said cutting blade adapter mounted in and completely enclosed by said recess;
  said one of a cutting blade and a cutting blade adapter having a perimeter, said perimeter of said one of a cutting blade and a cutting blade adapter conforming to at least a portion of said perimeter of said cross-section of said recess in a region of both of said first and second dimensions.

4. The tool of claim 3 wherein said longitudinal axis of said cross-section of said recess is parallel to said longitudinal axis of said holder.

5. The tool of claim 3 wherein said cross-section of said recess is a mirror image about said longitudinal axis of said cross-section of said recess.

6. The tool of claim 3 wherein said one of said cutting blade and said cutting blade adapter is fixedly mounted in said recess.

7. The tool of claim 3 wherein said one of said cutting blade and said cutting blade adapter is moveably mounted in said recess.

8. The tool of claim 3 wherein said cross-section of said recess and said cross-section of said one of said cutting blade and said cutting blade adapter differ enough that loads are transmitted therebetween through less than all of said perimeters.

9. The tool of claim 3 wherein:
  said lengths of said first and second transverse dimensions are twice a length of first and second radii, respectively, said first and second radii having first and second centers, respectively, spaced along said longitudinal axis of said cross-section, each said center of each said radius being located one of a) on said longitudinal axis of said cross-section, and b) spaced transversely from said longitudinal axis of said cross-section; and wherein
  said length of said third transverse dimension is one of a) a length between an intersection of said radii on opposite sides of said longitudinal axis of said cross-section and b) a length between a connection of said radii on opposite sides of said longitudinal axis of said cross-section.

10. The tool of claim 9 wherein both radii centers are located on said longitudinal axis of said cross-section.

11. The tool of claim 9 wherein at least one of said radii centers is located on said longitudinal axis of said cross-section.

12. The tool of claim 9 wherein said first and second radii are of unequal length.

13. The tool of claim 9 wherein said radii centers are spaced along said longitudinal axis of said cross-section a distance less than a sum of said first and second radii lengths.

14. The tool of claim 13 wherein said radii sharply intersect.

15. The tool of claim 13 wherein said radii smoothly intersect via a third radius on one side of said longitudinal axis of said cross-section and via a fourth radius on the other side of said longitudinal axis of said cross-section, said third and fourth radii extending inwardly toward said longitudinal axis of said cross-section.

16. A tool for at least one of countersinking, deburring, and spindling out holes, said tool comprising:
  a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;
  said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and
  one of a cutting blade and a cutting blade adapter for receiving a cutting blade having a cross-section which corresponds approximately to said recess cross-section, said one of said cutting blade and said cutting blade adapter mounted in and completely enclosed by said recess;
  said lengths of said first and second transverse dimensions are twice a length of first and second radii, respectively, said first and second radii having first and second centers, respectively, spaced along said longitudinal axis of said cross-section, and wherein
  said length of said third transverse dimension is one of a) a length between an intersection of said radii on opposite sides of said longitudinal axis of said cross-section, and b) a length between a connection of said radii on opposite sides of said longitudinal axis of said cross-section;
  wherein at least one of said radii centers is located spaced transversely from said longitudinal axis of said cross-section.

17. The tool of claim 16 wherein both said radii centers are located spaced transversely from said longitudinal axis of said cross-section.

18. The tool of claim 17 wherein said radii centers are positioned on opposite sides of said longitudinal axis of said cross-section.

19. A tool for at least one of countersinking, deburring, and spindling out holes, said tool comprising:
  a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

said lengths of said first and second transverse dimensions are twice a length of first and second radii, respectively, said first and second radii having first and second centers, respectively, spaced along said longitudinal axis of said cross-section, each said center of each said radius being located one of a) on said longitudinal axis of said cross-section, and b) spaced transversely from said longitudinal axis of said cross-section; and wherein said length of said third transverse dimension is one of a) a length between an intersection of said radii on opposite sides of said longitudinal axis of said cross-section, and b) a length between a connection of said radii on opposite sides of said longitudinal axis of said cross-section;

wherein said first and second radii are of equal length.

20. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

said lengths of said first and second transverse dimensions are twice a length of first and second radii, respectively, said first and second radii having first and second centers, respectively, spaced along said longitudinal axis of said cross-section, each said center of each said radius being located one of a) on said longitudinal axis of said cross-section, and b) spaced transversely from said longitudinal axis of said cross-section; and wherein said length of said third transverse dimension is one of a) a length between an intersection of said radii on opposite sides of said longitudinal axis of said cross-section, and b) a length between a connection of said radii on opposite sides of said longitudinal axis of said cross-section;

wherein each of said radii forms an arc having two ends located on opposite sides of said longitudinal axis of said cross-section, and wherein corresponding ones of said ends of said arcs on each side of said longitudinal axis of said cross-section are connected with straight lines.

21. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

said lengths of said first and second transverse dimensions are twice a length of first and second radii, respectively, said first and second radii having first and second centers, respectively, spaced along said longitudinal axis of said cross-section, each said center of each said radius being located one of a) on said longitudinal axis of said cross-section, and b) spaced transversely from said longitudinal axis of said cross-section; and wherein said length of said third transverse dimension is one of a) a length between an intersection of said radii on opposite sides of said longitudinal axis of said cross-section, and b) a length between a connection of said radii on opposite sides of said longitudinal axis of said cross-section;

wherein said radii centers are spaced along said longitudinal axis of said cross-section a distance greater than a sum of said first and second radii lengths.

22. The tool of claim 21 wherein each of said radii forms an arc having two ends located on opposite sides of said longitudinal axis of said cross-section, and wherein corresponding ones of said ends of said arcs on each side of said longitudinal axis of said cross-section are connected with straight lines.

23. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

wherein said longitudinal axis of said cross-section of said recess is parallel to said longitudinal axis of said holder;

wherein said longitudinal axis of said cross-section of said recess is also laterally offset from said longitudinal axis of said holder such that said recess is arranged eccentrically in said blade holder.

24. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

wherein said longitudinal axis of said cross-section of said recess is perpendicular to said longitudinal axis of said holder.

25. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

wherein said cross-section of said recess also has a transverse axis, and wherein said cross-section of said recess is a mirror image about said transverse axis of said cross-section of said recess.

26. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

wherein said cross-section of said recess also has a transverse axis, and wherein said cross-section of said recess is a mirror image about said longitudinal axis of said cross-section of said recess and about said transverse axis of said cross-section of said recess.

27. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

wherein said cross-section of said recess also has a transverse axis, and said first and second transverse dimensions are defined by first and second pentagons positioned on opposite sides of said transverse axis such that a vertex of each said pentagon extends across said transverse axis toward the other said pentagon, said third dimension defined across said transverse axis at an intersection of said pentagons.

28. A tool for at least one of countersinking, deburring, and spindling out holes, said tool comprising:

a blade holder having first and second ends and a longitudinal axis, a recess formed in said holder and extending generally transverse to said holder longitudinal axis, said recess having a cross-section, said cross-section having a longitudinal axis, said recess being positioned a sufficient distance from said holder ends such that a perimeter of said cross-section of said recess is closed;

said cross-section of said recess having first and second dimensions transverse to said longitudinal axis of said cross-section and spaced along said longitudinal axis of said cross-section, and a third dimension transverse to said longitudinal axis of said cross-section between said first and second dimensions, said third dimension having a length which is less than a length of said first dimension and a length of said second dimension; and one of a cutting blade and a cutting blade adapter for receiving a cutting blade having a cross-section which corresponds approximately to said recess cross-section, said one of said cutting blade and said cutting blade adapter mounted in and completely enclosed by said recess;

wherein said cross-section of said recess also has a transverse axis, and said first and second transverse dimensions are defined by first and second polygons positioned on opposite sides of said transverse axis such that a vertex of each said polygon extends across said transverse axis toward the other said polygon, said third dimension defined across said transverse axis at an intersection of said polygons.

* * * * *